United States Patent
Li

(10) Patent No.: US 10,739,913 B2
(45) Date of Patent: Aug. 11, 2020

(54) PROTECTIVE FILM DETECTION METHOD AND APPARATUS, AND STORAGE MEDIUM

(71) Applicant: BEIJING XIAOMI MOBILE SOFTWARE CO., LTD., Beijing (CN)

(72) Inventor: Guosheng Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/243,231

(22) Filed: Jan. 9, 2019

(65) Prior Publication Data
US 2019/0235698 A1    Aug. 1, 2019

(30) Foreign Application Priority Data
Jan. 31, 2018 (CN) .......................... 2018 1 0096882

(51) Int. Cl.
G06F 3/041 (2006.01)
G06F 3/044 (2006.01)

(52) U.S. Cl.
CPC ............ G06F 3/0418 (2013.01); G06F 3/044 (2013.01)

(58) Field of Classification Search
CPC .. G06F 3/03545; G06F 3/0412; G06F 3/0418; G06F 3/044
See application file for complete search history.

(56) References Cited

U.S. PATENT DOCUMENTS

| | | | | |
|---|---|---|---|---|
| 5,650,597 A * | 7/1997 | Redmayne | ............ | G06F 3/044 178/18.06 |
| 7,345,680 B2 * | 3/2008 | David | ................ | B32B 17/064 178/18.01 |
| 7,746,325 B2 * | 6/2010 | Roberts | ................. | G06F 3/0414 345/173 |
| 8,502,800 B1 * | 8/2013 | Vier | ...................... | G06F 3/0416 345/169 |
| 8,730,199 B2 * | 5/2014 | Sleeman | ................. | G01L 1/146 345/173 |
| 8,753,571 B2 * | 6/2014 | Hsu | ....................... | G06F 1/1607 134/117 |
| 8,773,366 B2 * | 7/2014 | Hable | .................. | G06F 3/0416 345/173 |
| 8,847,979 B2 * | 9/2014 | Smith | ...................... | G06F 3/01 345/619 |
| 9,035,872 B2 * | 5/2015 | Brown | ..................... | G06F 3/01 345/156 |

(Continued)

FOREIGN PATENT DOCUMENTS

EP    2442215 A2    4/2012
JP    2013175109 A   9/2013

(Continued)

OTHER PUBLICATIONS

Extended European search report of counterpart EP application No. 19154285.1 dated Jun. 13, 2019.

Primary Examiner — Michael J Jansen, II
(74) Attorney, Agent, or Firm — Syncoda LLC; Feng Ma

(57) ABSTRACT

A method of detecting a protection film includes collecting a signal change level of a touch screen, the signal change level including a difference between a signal level generated from a touch operation and a signal level generated from no touch operation; and determining that a protective film has been attached to the touch screen upon the signal change level satisfying a preset condition.

17 Claims, 5 Drawing Sheets

(56) References Cited

U.S. PATENT DOCUMENTS

| | | | | |
|---|---|---|---|---|
| 9,081,452 B2* | 7/2015 | Immonen | | G06F 3/044 |
| 9,110,550 B2* | 8/2015 | Simmons | | G06F 3/0418 |
| 9,164,608 B2* | 10/2015 | Kim | | G06F 3/041 |
| 9,383,881 B2* | 7/2016 | Day | | G06F 3/045 |
| 9,411,472 B2* | 8/2016 | Simmons | | G06F 3/044 |
| 9,575,555 B2* | 2/2017 | Smith | | G06F 3/01 |
| 9,710,114 B2* | 7/2017 | Lee | | G06F 3/044 |
| 9,841,841 B2* | 12/2017 | Hwang | | G06F 3/044 |
| 9,904,314 B2* | 2/2018 | Tokutake | | G06F 3/0416 |
| 10,042,446 B2* | 8/2018 | Yoon | | G06F 3/044 |
| 10,101,844 B2* | 10/2018 | Lee | | G06F 3/0416 |
| 10,386,948 B2* | 8/2019 | Barel | | G06F 3/0418 |
| 10,551,984 B2* | 2/2020 | Kies | | G06F 3/0414 |
| 10,599,266 B2* | 3/2020 | Uchiyama | | G06F 3/045 |
| 2003/0206162 A1* | 11/2003 | Roberts | | G06F 3/0414 |
| | | | | 345/173 |
| 2004/0004605 A1* | 1/2004 | David | | B32B 17/064 |
| | | | | 345/173 |
| 2010/0308844 A1* | 12/2010 | Day | | G06F 3/045 |
| | | | | 324/663 |
| 2010/0315348 A1* | 12/2010 | Jellicoe | | G06F 3/041 |
| | | | | 345/173 |
| 2011/0057899 A1* | 3/2011 | Sleeman | | G01L 1/146 |
| | | | | 345/174 |
| 2011/0115717 A1* | 5/2011 | Hable | | G06F 3/0416 |
| | | | | 345/173 |
| 2012/0268394 A1* | 10/2012 | Hsu | | G06F 1/1607 |
| | | | | 345/173 |
| 2012/0268411 A1* | 10/2012 | Chen | | G06F 3/0416 |
| | | | | 345/174 |
| 2013/0106710 A1* | 5/2013 | Ashbrook | | G06F 3/0488 |
| | | | | 345/173 |
| 2013/0147752 A1* | 6/2013 | Simmons | | G06F 3/044 |
| | | | | 345/174 |
| 2013/0181935 A1* | 7/2013 | McKenzie | | G06F 3/044 |
| | | | | 345/174 |
| 2013/0187882 A1* | 7/2013 | Kim | | G06F 3/041 |
| | | | | 345/173 |
| 2013/0328825 A1* | 12/2013 | Brown | | G06F 3/01 |
| | | | | 345/174 |
| 2013/0328914 A1* | 12/2013 | Smith | | G06F 3/01 |
| | | | | 345/619 |
| 2014/0139477 A1* | 5/2014 | Immonen | | G06F 3/044 |
| | | | | 345/174 |
| 2014/0218337 A1* | 8/2014 | Yamaguchi | | G06F 3/044 |
| | | | | 345/174 |
| 2014/0232691 A1* | 8/2014 | Lee | | G06F 3/044 |
| | | | | 345/174 |
| 2014/0333569 A1* | 11/2014 | Simmons | | G06F 3/0418 |
| | | | | 345/174 |
| 2014/0362030 A1* | 12/2014 | Mo | | G06F 3/044 |
| | | | | 345/174 |
| 2015/0077372 A1* | 3/2015 | Smith | | G06F 3/01 |
| | | | | 345/173 |
| 2015/0242009 A1* | 8/2015 | Xiao | | G06F 3/044 |
| | | | | 345/174 |
| 2015/0261378 A1* | 9/2015 | Lee | | G06F 3/0416 |
| | | | | 715/765 |
| 2015/0323963 A1* | 11/2015 | Tokutake | | G06F 1/1628 |
| | | | | 345/173 |
| 2016/0077641 A1 | 3/2016 | Gowreesunker | | |
| 2016/0170531 A1 | 6/2016 | Lee et al. | | |
| 2016/0202839 A1* | 7/2016 | Hwang | | G06F 3/0416 |
| | | | | 345/174 |
| 2016/0216794 A1* | 7/2016 | Yoon | | G06F 3/041 |
| 2017/0060335 A1 | 3/2017 | Chiang | | |
| 2017/0123532 A1* | 5/2017 | Zhao | | G06F 3/044 |
| 2019/0018527 A1* | 1/2019 | Barel | | G06F 3/044 |
| 2019/0056827 A1* | 2/2019 | Uchiyama | | G06F 3/0418 |
| 2019/0073001 A1* | 3/2019 | Kim | | G06F 1/1637 |
| 2019/0114005 A1* | 4/2019 | Kies | | G06F 3/048 |
| 2019/0235660 A1* | 8/2019 | Kim | | G06F 1/1656 |
| 2019/0235698 A1* | 8/2019 | Li | | G06F 3/0418 |

FOREIGN PATENT DOCUMENTS

| | | |
|---|---|---|
| JP | 2013206032 A | 10/2013 |
| WO | 2019013887 A1 | 1/2019 |

* cited by examiner

PROTECTIVE FILM DETECTION METHOD AND APPARATUS, AND STORAGE MEDIUM

CROSS-REFERENCE TO RELATED APPLICATIONS

This application claims priority to Chinese Patent Application 201810096882.4, filed on Jan. 31, 2018, the disclosure of which is incorporated herein by reference in its entirety.

BACKGROUND

In recent years, touch screens, with the advantages of simple and convenient interactions with users, accurate positioning and quick response, have gradually become most commonly used display screens for smart devices. Because the touch screen can have a large size, many users may attach a protective film over the touch screen to better protect the touch screen.

SUMMARY

The present disclosure generally relates to a protective film detection method and apparatus, and a storage medium.

The inventors of the present disclosure have recognized that, once a protective film is attached to the touch screen, the protective film may affect the operation process of the smart device.

According to a first aspect of the present disclosure, there is provided a protective film detection method for detecting whether the touch screen has been attached with a protective film. In some embodiments, the method includes:

collecting a signal change level (e.g., signal change amount) of a touch screen equipped on a smart device, the signal change level being a difference between a signal level generated when a touch operation is triggered on the touch screen and a signal level generated when no touch operation is triggered on the touch screen; and determining that a protective film has been attached to the touch screen when the signal change level satisfies a preset condition; the preset condition being used to indicate a condition that a signal change level of the touch screen attached with the protective film needs to satisfy.

In some implementations, the preset condition is determined according to a change rule of the signal change level of the touch screen attached with the protective film; and the collecting a signal change level of a touch screen equipped on a smart device comprises: collecting signal change levels of the touch screen within a plurality of time periods; and the determining that a protective film has been attached to the touch screen when the signal change level satisfies a preset condition comprises: determining that the protective film has been attached to the touch screen when the signal change levels of the touch screen within the plurality of time periods satisfy the preset condition.

In some other implementations, the collecting signal change levels of the touch screen within a plurality of time periods comprises:

collecting signal change levels when the touch screen displays the same interface within the plurality of time periods; or collecting signal change levels when the touch screen is in the same external environment within the plurality of time periods; or collecting signal change levels when the touch screen is in the same external environment and displays the same interface within the plurality of time periods.

In some other implementations, the collecting signal change levels of the touch screen within a plurality of time periods comprises:

collecting a preset number of signal change levels of the touch screen within each of the time periods; and performing statistics for the preset number of signal change levels, and obtaining a statistical value as a signal change level of the touch screen in a corresponding time period.

In some other implementations, the performing statistics for the preset number of signal change levels, and obtaining a statistical value as a signal change level of the touch screen in a corresponding time period comprises:

calculating an average value of the preset number of signal change levels; or deleting a maximum value and a minimum value from the preset number of signal change levels, and calculating an average value of remaining signal change levels; or establishing a distribution model according to the preset number of signal change levels, the distribution model comprising an occurrence probability of each of the signal change levels, and collecting a signal change level having a maximum occurrence probability in the distribution model.

In some other implementations, the determining that the protective film has been attached to the touch screen when the signal change levels of the touch screen within the plurality of time periods satisfy the preset condition comprises:

determining that the protective film has been attached to the touch screen when a difference between the signal change level of the touch screen within a first time period and the signal change level of the touch screen within a second time period is greater than a preset difference, the first time period being a time period preceding the second time period, and the preset difference being used to indicate a difference between the signal change level of the touch screen before being attached with the protective film and the signal change level of the touch screen after being attached with the protective film.

In some other implementations, the determining that the protective film has been attached to the touch screen when the signal change levels of the touch screen within the plurality of time periods satisfy the preset condition comprises:

determining that the protective film has been attached to the touch screen when a difference between the signal change level of the touch screen within a first time period and the signal change level of the touch screen within a second time period is greater than a preset difference, and a difference between the signal change level of the touch screen within the second time period and the signal change level of the touch screen within a third time period is not greater than the preset difference, the first time period being a time period preceding the second time period, the third time period being a time period next to the second time period, and the preset difference being used to indicate a difference between the signal change level of the touch screen before being attached with the protective film and the signal change level of the touch screen after being attached with the protective film.

In some other implementations, the determining that the protective film has been attached to the touch screen when the signal change levels of the touch screen within the plurality of time periods satisfy the preset condition comprises:

determining that the protective film has been attached to the touch screen when a difference between the signal change level of the touch screen within at least one first time period and the signal change level of the touch screen within a second time period is greater than a preset difference, and a difference between the signal change level of the touch screen within the second time period and the signal change level of the touch screen within at least one third time period is not greater than the preset difference, the at least one first time period being a time period preceding the second time period, the at least one third time period being a time period next to the second time period, and the preset difference being used to indicate a difference between the signal change level of the touch screen before being attached with the protective film and the signal change level of the touch screen after being attached with the protective film.

In some other implementations, the preset condition comprises a signal change level of a reference touch screen attached with a protective film; and the determining that a protective film has been attached to the touch screen when the signal change level satisfies a preset condition comprises: determining that the protective film has been attached to the touch screen when a difference between the signal change level of the touch screen and the signal change level of the reference touch screen is not greater than a preset threshold, the preset threshold being used to indicate a fluctuating range of the signal change level of the touch screen attached with the protective film.

In some other implementations, the method further comprises:

collecting signal change levels of touch screens equipped on a plurality of smart devices; and performing statistics for a plurality of signal change levels falling within a preset range among the collected signal change levels, and obtaining a statistical value as the signal change level of the reference touch screen, the preset range being used to indicate a range of the signal change level of the touch screen attached with the protective film.

In some other implementations, the collecting signal change levels of touch screens equipped on a plurality of smart devices comprises: collecting the signal change levels of the touch screens equipped on the plurality of smart devices and state information thereof; and the performing statistics for a plurality of signal change levels falling within a preset range among the collected signal change levels, and obtaining a statistical value as the signal change level of the reference touch screen comprises:

performing statistics for a plurality of signal change levels having the same state information and falling within the preset range among the collected signal change levels, and obtaining an obtained statistical value as a signal change level of the reference touch screen corresponding to the state information.

In some other implementations, the determining that the protective film has been attached to the touch screen when a difference between the signal change level of the touch screen and the signal change level of the reference touch screen attached with the protective film is not greater than a preset threshold comprises:

determining the signal change level of the reference touch screen corresponding to the state information of the touch screen; and determining that the protective film has been attached to the touch screen when a difference between the signal change level of the touch screen and the determined signal change level of the reference touch screen is not greater than the preset threshold.

In some other implementations, the state information comprises at least one of screen type, external environment information and currently displayed interface.

In some other implementations, the performing statistics for a plurality of signal change levels falling within a preset range among the collected signal change levels, and obtaining a statistical value as the signal change level of the reference touch screen comprises:

calculating an average value of the plurality of signal change levels; or deleting a maximum value and a minimum value from the plurality of signal change levels, and calculating an average value of remaining signal change levels; or establishing a distribution model according to the plurality of signal change levels, the distribution model comprising an occurrence probability of each of the signal change levels, and collecting a signal change level having a maximum occurrence probability in the distribution model.

In some other implementations, the method further comprises:

reducing a response signal level of the touch screen when it is determined that the protective film has been attached to the touch screen, wherein the touch screen is configured to make a response to a touch operation when a signal level generated by the touch operation triggered on the touch screen is greater than the response signal level.

In some other implementations, the smart device is further equipped with a distance sensor; and the method further comprises:

displaying prompt information on the touch screen when it is determined that the protective film has been attached to the touch screen and distances detected by the distance sensor for consecutive multiple times are all less than a preset distance, wherein the prompt information is used to prompt it is possible that the attached protective film shields the distance sensor.

According to a second aspect of embodiments of the present disclosure, there is provided a protective film detection apparatus, comprising:

a collecting module configured to collect a signal change level of a touch screen equipped on a smart device, the signal change level being a difference between a signal level generated when a touch operation is triggered on the touch screen and a signal level generated when no touch operation is triggered on the touch screen; and a determining module configured to determine that a protective film has been attached to the touch screen when the signal change level satisfies a preset condition, the preset condition being used to indicate a condition that a signal change level of the touch screen attached with the protective film needs to satisfy.

In some implementations, the preset condition is determined according to a change rule of the signal change level of the touch screen attached with the protective film; and the collecting module is configured to collect signal change levels of the touch screen within a plurality of time periods; and the determining module is configured to determine that the protective film has been attached to the touch screen when the signal change levels of the touch screen within the plurality of time periods satisfy the preset condition.

In some other implementations, the collecting module is configured to:

collect signal change levels when the touch screen displays the same interface within the plurality of time periods; or collect signal change levels when the touch screen is in the same external environment within the plurality of time periods; or collect signal change levels when the touch screen is in the same external environment and displays the same interface within the plurality of time periods.

In some other implementations, the collecting module comprises:

a collecting unit configured to collect a preset number of signal change levels within each of the time periods; and a statistics unit configured to perform statistics for the preset number of signal change levels, and obtaining a statistical value as a signal change level of the touch screen in a corresponding time period.

In some other implementations, the statistics unit is further configured to: calculate an average value of the preset number of signal change levels; or delete a maximum value and a minimum value from the preset number of signal change levels, and calculate an average value of remaining signal change levels; or establish a distribution model according to the preset number of signal change levels, the distribution model comprising an occurrence probability of each of the signal change levels, and collect a signal change level having a maximum occurrence probability in the distribution model.

In some other implementations, the determining module comprises:

a first determining unit configured to determine that the protective film has been attached to the touch screen when a difference between the signal change level of the touch screen within a first time period and the signal change level of the touch screen within a second time period is greater than a preset difference, the first time period being a time period preceding the second time period, and the preset difference being used to indicate a difference between the signal change level of the touch screen before being attached with the protective film and the signal change level of the touch screen after being attached with the protective film.

In some other implementations, the determining module comprises:

a second determining unit configured to determine that the protective film has been attached to the touch screen when a difference between the signal change level of the touch screen within a first time period and the signal change level of the touch screen within a second time period is greater than a preset difference, and a difference between the signal change level of the touch screen within the second time period and the signal change level of the touch screen within a third time period is not greater than the preset difference, the first time period being a time period preceding the second time period, the third time period being a time period next to the second time period, and the preset difference being used to indicate a difference between the signal change level of the touch screen before being attached with the protective film and the signal change level of the touch screen after being attached with the protective film.

In some other implementations, the determining module comprises:

a third determining unit configured to determine that the protective film has been attached to the touch screen when a difference between the signal change level of the touch screen within at least one first time period and the signal change level of the touch screen within a second time period is greater than a preset difference, and a difference between the signal change level of the touch screen within the second time period and the signal change level of the touch screen within at least one third time period is not greater than the preset difference, the at least one first time period being a time period preceding the second time period, the at least one third time period being a time period next to the second time period, and the preset difference being used to indicate a difference between the signal change level of the touch screen before being attached with the protective film and the signal change level of the touch screen after being attached with the protective film.

In some other implementations, the preset condition comprises a signal change level of a reference touch screen attached with a protective film; and the determining module is configured to determine that a protective film has been attached to the touch screen when the signal change level satisfies a preset condition comprises: determining that the protective film has been attached to the touch screen when a difference between the signal change level of the touch screen and the signal change level of the reference touch screen is not greater than a preset threshold, the preset threshold being used to indicate a fluctuating range of the signal change level of the touch screen attached with the protective film.

In some other implementations, the apparatus further comprises:

a collecting module configured to collect signal change levels of touch screens equipped on a plurality of smart devices; and a statistics module configured to perform statistics for a plurality of signal change levels falling within a preset range among the collected signal change levels, and obtain a statistical value as the signal change level of the reference touch screen, the preset range being used to indicate a range of the signal change level of the touch screen attached with the protective film.

In some other implementations, the collecting module is further configured to collect the signal change levels of the touch screens equipped on the plurality of smart devices and state information thereof; and the statistics module is further configured to perform statistics for a plurality of signal change levels having the same state information and falling within the preset range among the collected signal change levels, and obtain a statistical value as a signal change level of the reference touch screen corresponding to the state information.

In some other implementations, the determining module is further configured to determine the signal change level of the reference touch screen corresponding to the state information of the touch screen; and determine that the protective film has been attached to the touch screen when a difference between the signal change level of the touch screen and the determined signal change level of the reference touch screen is not greater than the preset threshold.

In some other implementations, the state information comprises at least one of screen type, external environment information and currently displayed interface.

In some other implementations, the statistics module is further configured to:

calculate an average value of the plurality of signal change levels; or delete a maximum value and a minimum value from the plurality of signal change levels, and calculating an average value of remaining signal change levels; or establish a distribution model according to the plurality of signal change levels, the distribution model comprising an occurrence probability of each of the signal change levels, and collecting a signal change level having a maximum occurrence probability in the distribution model.

In some other implementations, the apparatus further comprises:

a responding module configured to reduce a response signal level of the touch screen when it is determined that the protective film has been attached to the touch screen, wherein the touch screen is configured to make a response to a touch operation when a signal level generated by the touch operation triggered on the touch screen is greater than the response signal level.

In some other implementations, the smart device is further equipped with a distance sensor; the apparatus further comprising:

a prompting module configured to display prompt information on the touch screen when it is determined that the protective film has been attached to the touch screen and distances detected by the distance sensor for consecutive multiple times are all less than a preset distance, wherein the prompt information is used to prompt it is possible that the attached protective film shields the distance sensor.

According to a third aspect of the present disclosure, there is provided a protective film detection apparatus, comprising: a processor; and a memory for storing instructions executable by the processor; wherein the processor is configured to: collect a signal change level of a touch screen equipped on a smart device, the signal change level being a difference between a signal level generated when a touch operation is triggered on the touch screen and a signal level generated when no touch operation is triggered on the touch screen; and determine that a protective film has been attached to the touch screen when the signal change level satisfies a preset condition, the preset condition being used to indicate a condition that a signal change level of the touch screen attached with the protective film needs to satisfy.

According to a fourth aspect of the present disclosure, there is provided a non-transitory computer-readable storage medium having stored therein at least an instruction that, when executed and performed by a processor to perform the operations in the protective film detection method in the first aspect.

It is to be understood that, both the foregoing general description and the following detailed description describe only some embodiments by way of example, and are not restrictive of the present disclosure.

BRIEF DESCRIPTION OF THE DRAWINGS

In order to clearly illustrate the various embodiments provided in the present disclosure, the following are drawings that accompany the description of the embodiments.

It is noted that these drawings should be interpreted to serve illustrating purposes only, and that these drawings may represent just some, but not all, of embodiments of the present disclosure. For those skilled in the art, other embodiments that are based on the structures as described below and illustrated in these drawings may become obvious. As such, these other embodiments should be interpreted to be contained within the scope of the disclosure.

DETAILED DESCRIPTION

Descriptions will now be made in detail with respect to some embodiments, examples of which are illustrated in the accompanying drawings. The following description refers to the accompanying drawings in which the same numbers in different drawings may represent the same or similar elements unless otherwise represented. The implementations set forth in the following description of example embodiments do not represent all implementations consistent with the disclosure. Instead, they are merely examples of devices and methods consistent with aspects related to the disclosure as recited in the appended claims.

There is provided in the present disclosure a protective film detection method and apparatus, and a storage medium. The present disclosure will be illustrated in detail with reference to the enclosed drawings.

Figure 1:
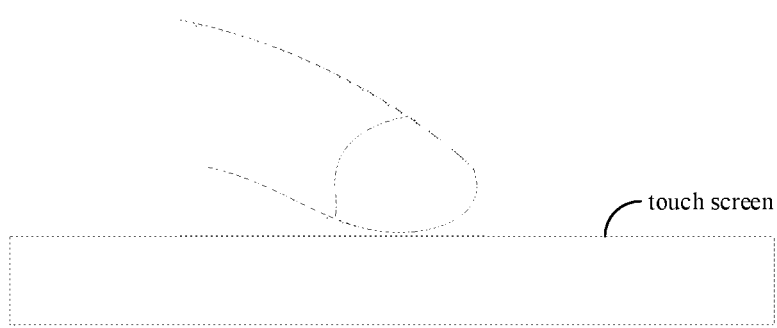
FIG. 1 is a schematic diagram of a touch control screen.
Figure 2:
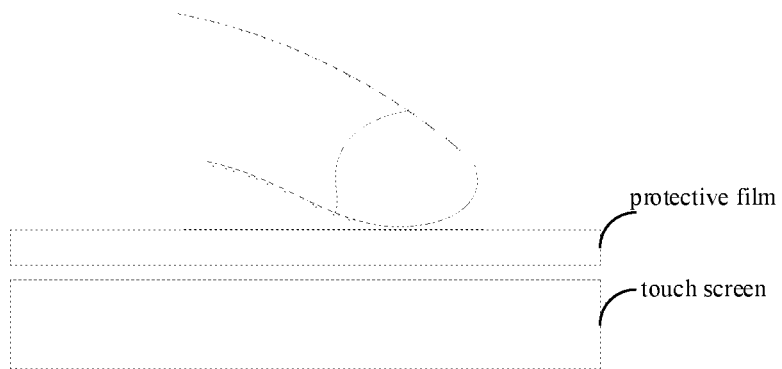
FIG. 2 is a schematic diagram of a protective film attached to a touch control screen.

Referring to FIG. 1 and FIG. 2, each time the user performs a touch operation on the touch screen, the touch operation needs to be performed over the protective film. As a result, the touch operation on the touch screen may not receive a timely response, which affects the sensitivity of the touch screen. Accordingly, embodiments of the present disclosure provide a method of detecting whether the touch screen has been attached with a protective film.

Figure 3:
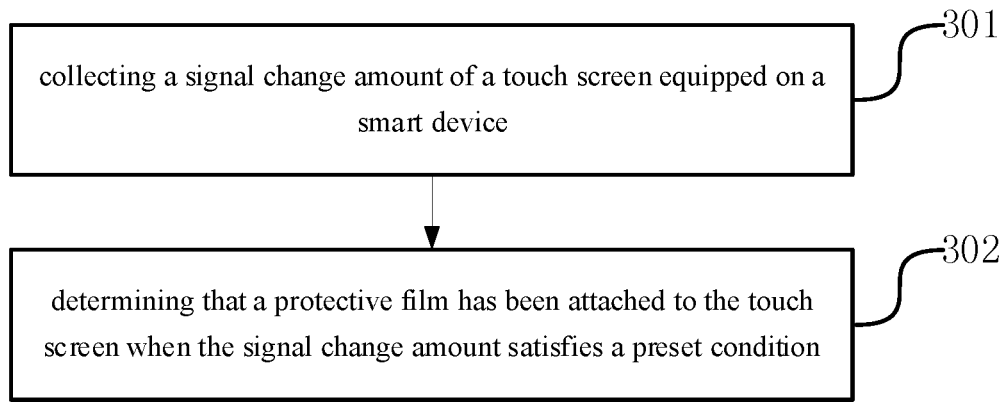
FIG. 3 is a flowchart of a protective film detection method according to some embodiments.

FIG. 3 is a flowchart of a protective film detection method according to some embodiments. As shown in FIG. 3, the method includes the following steps.

In step 301, a signal change level of a touch screen equipped on a smart device is collected.

Here, the signal change level is a difference between a signal level generated when a touch operation is triggered on the touch screen and a signal level generated when no touch operation is triggered on the touch screen.

In step 302, it is determined that a protective film has been attached to the touch screen when the signal change level satisfies a preset condition. The preset condition is used to indicate a condition that a signal change level of the touch screen attached with the protective film needs to satisfy.

In the method provided in the embodiments of the present disclosure, the signal change level of the touch screen is collected. When the signal change level satisfies the condition where the signal change level of the touch screen is attached with the protective film, it is determined that touch screen is attached with the protective film. The embodiments of the present disclosure provide a method for automatically detecting whether the protective film is attached, which enriches the functions of the smart device.

In some implementations, the preset condition is determined according to a change rule of the signal change level of the touch screen attached with the protective film; and the collecting a signal change level of a touch screen equipped on a smart device includes: collecting signal change levels of the touch screen within a plurality of time periods;

The determining that a protective film has been attached to the touch screen when the signal change level satisfies a preset condition includes: determining that the protective film has been attached to the touch screen when the signal change levels of the touch screen within the plurality of time periods satisfy the preset condition.

In some other implementations, the collecting signal change levels of the touch screen within a plurality of time periods includes:

collecting signal change levels when the touch screen displays the same interface within the plurality of time periods; or collecting signal change levels when the touch screen is in the same external environment within the plurality of time periods; or collecting signal change levels when the touch screen is in the same external environment and displays the same interface within the plurality of time periods.

In some other implementations, the collecting signal change levels of the touch screen within a plurality of time periods includes:

collecting a preset number of signal change levels of the touch screen within each of the time periods; and collecting statistics for the preset number of signal change levels, and obtaining a statistical value as a signal change level of the touch screen in a corresponding time period.

In some other implementations, the performing statistics for the preset number of signal change levels, and obtaining a statistical value as a signal change level of the touch screen in a corresponding time period includes:

calculating an average value of the preset number of signal change levels; or deleting a maximum value and a minimum value from the preset number of signal change levels, and calculating an average value of remaining signal change levels; or establishing a distribution model according to the preset number of signal change levels, the distribution model comprising an occurrence probability of each of the signal change levels, and collecting a signal change level having a maximum occurrence probability in the distribution model.

In some other implementations, the determining that the protective film has been attached to the touch screen when the signal change levels of the touch screen within the plurality of time periods satisfy the preset condition includes:

determining that the protective film has been attached to the touch screen when a difference between the signal change level of the touch screen within a first time period and the signal change level of the touch screen within a second time period is greater than a preset difference, the first time period being a time period preceding the second time period, and the preset difference being used to indicate a difference between the signal change level of the touch screen before being attached with the protective film and the signal change level of the touch screen after being attached with the protective film.

In some other implementations, the determining that the protective film has been attached to the touch screen when the signal change levels of the touch screen within the plurality of time periods satisfy the preset condition includes:

determining that the protective film has been attached to the touch screen when a difference between the signal change level of the touch screen within a first time period and the signal change level of the touch screen within a second time period is greater than a preset difference, and a difference between the signal change level of the touch screen within the second time period and the signal change level of the touch screen within a third time period is not greater than the preset difference, the first time period being a time period preceding the second time period, the third time period being a time period next to the second time period, and the preset difference being used to indicate a difference between the signal change level of the touch screen before being attached with the protective film and the signal change level of the touch screen after being attached with the protective film.

In some other implementations, the determining that the protective film has been attached to the touch screen when the signal change levels of the touch screen within the plurality of time periods satisfy the preset condition includes:

determining that the protective film has been attached to the touch screen when a difference between the signal change level of the touch screen within at least one first time period and the signal change level of the touch screen within a second time period is greater than a preset difference, and a difference between the signal change level of the touch screen within the second time period and the signal change level of the touch screen within at least one third time period is not greater than the preset difference, the at least one first time period being a time period preceding the second time period, the at least one third time period being a time period next to the second time period, and the preset difference being used to indicate a difference between the signal change level of the touch screen before being attached with the protective film and the signal change level of the touch screen after being attached with the protective film.

In some other implementations, the preset condition comprises a signal change level of a reference touch screen attached with a protective film; and the determining that a protective film has been attached to the touch screen when the signal change level satisfies a preset condition includes: determining that the protective film has been attached to the touch screen when a difference between the signal change level of the touch screen and the signal change level of the reference touch screen is not greater than a preset threshold, the preset threshold being used to indicate a fluctuating range of the signal change level of the touch screen attached with the protective film.

In some other implementations, the method further includes:

collecting signal change levels of touch screens equipped on a plurality of smart devices; and performing statistics for a plurality of signal change levels falling within a preset range among the collected signal change levels, and obtaining a statistical value as the signal change level of the reference touch screen, the preset range being used to indicate a range of the signal change level of the touch screen attached with the protective film.

In some other implementations, the collecting signal change levels of touch screens equipped on a plurality of smart devices includes: collecting the signal change levels of the touch screens equipped on the plurality of smart devices and state information thereof; and the performing statistics for a plurality of signal change levels falling within a preset range among the collected signal change levels, and obtaining a statistical value as the signal change level of the reference touch screen includes:

performing statistics for a plurality of signal change levels having the same state information and falling within the preset range among the collected signal change levels, and obtaining a statistical value as a signal change level of the reference touch screen corresponding to the state information.

In some other implementations, the determining that the protective film has been attached to the touch screen when a difference between the signal change level of the touch screen and the signal change level of the reference touch screen attached with the protective film is not greater than a preset threshold includes:

determining the signal change level of the reference touch screen corresponding to the state information of the touch screen; and determining that the protective film has been attached to the touch screen when a difference between the signal change level of the touch screen and the determined signal change level of the reference touch screen is not greater than the preset threshold.

Herein, the state information comprises at least one of screen type, external environment information and currently displayed interface.

In some other implementations, the collecting statistics for a plurality of signal change levels falling within a preset range among the collected signal change levels, and obtaining a statistical value as the signal change level of the reference touch screen includes:

calculating an average value of the plurality of signal change levels; or deleting a maximum value and a minimum value from the plurality of signal change levels, and calculating an average value of the remaining signal change levels; or establishing a distribution model according to the plurality of signal change levels, the distribution model comprising an occurrence probability of each of the signal change levels, and collecting a signal change level having a maximum occurrence probability in the distribution model.

In some other implementations, the method further includes:

reducing a response signal level of the touch screen when it is determined that the protective film has been attached to the touch screen, wherein the touch screen is configured to make a response to a touch operation when a signal level generated by the touch operation triggered on the touch screen is greater than the response signal level.

In some other implementations, the smart device is further equipped with a distance sensor; and the method further includes:

displaying prompt information on the touch screen when it is determined that the protective film has been attached to the touch screen and distances detected by the distance sensor for consecutive multiple times are all less than a preset distance, wherein the prompt information is used to prompt it is possible that the attached protective film shields the distance sensor.

Figure 4:
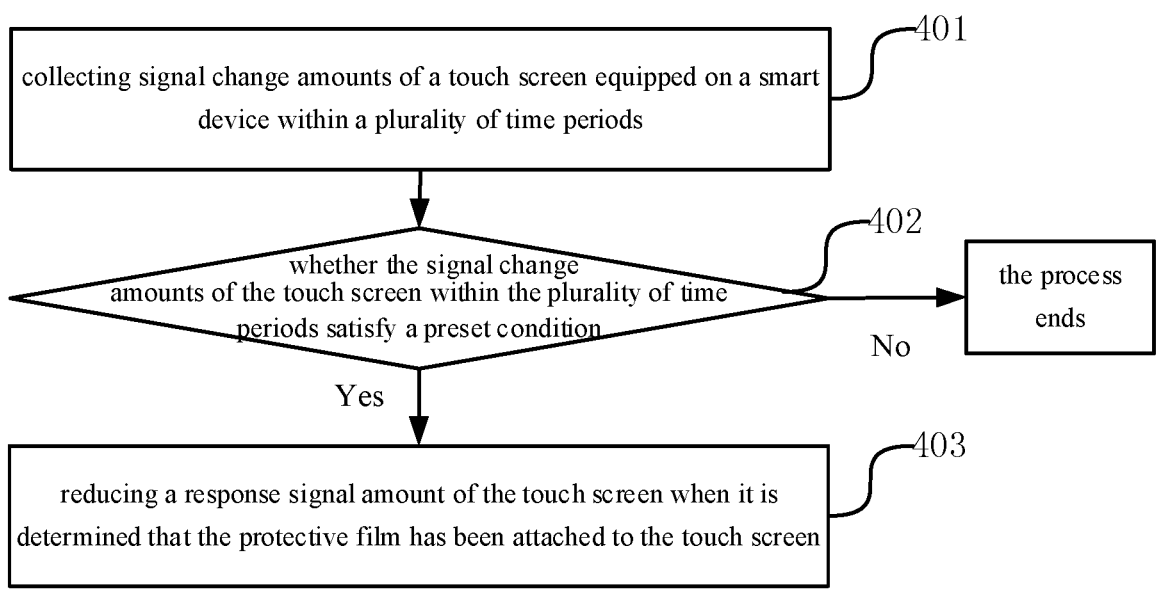
FIG. 4 is a flowchart of a protective film detection method according to some embodiments.

FIG. 4 is a flowchart of a protective film detection method according to some embodiments. As illustrated in FIG. 4, the method includes the following steps:

In step 401, signal change levels of a touch screen equipped on a smart device within a plurality of time periods are collected.

Herein, the smart device may be a mobile phone, a personal digital assistant, a computer, a tablet computer or the like devices. The smart device is equipped with a touch screen, and a user may trigger a touch operation of the touch screen to control the smart device.

In implementations, when the user does not trigger a touch operation on the touch screen, the touch screen may generate an inherent signal level; when the user triggers a touch operation on the touch screen, the signal level generated on the touch screen may change, such that a signal change level is generated. That is, the signal change level is a difference between a signal level generated when a touch operation is triggered on the touch screen and a signal level generated when no touch operation is triggered on the touch screen.

Whether a protective film is attached to the touch screen exerts some impacts on the signal change level. When no protective film is attached to the touch screen, a great signal change level is generated; whereas when a protective film is attached to the touch screen, the user needs to trigger the touch operation on the touch screen via the protective film. As a result, a sensing strength of the touch screen is weakened, and thus the signal change level generated on the touch screen is reduced.

For example, the touch screen has an inherent signal level of about 2000. When no protective film is attached to the touch screen, a signal level generated by a touch operation triggered by the user on the touch screen is 2200, and a signal change level is 200; whereas when a protective film is attached to the touch screen, a signal level generated by a touch operation triggered by the user on the touch screen is 2120, and a signal change level is 120. That is, the signal change level is reduced.

Therefore, the signal change levels of the touch screen within the plurality of time periods may be collected, and whether a protective film has been attached to the touch screen may be accurately detected according to the signal change levels within the plurality of time periods. For example, "diff" (change) data of the touch screen may be extracted, wherein the "diff" data may represent a signal change level of the touch screen. Each time period in the plurality of time periods may have the same time length, and the time length may be 1 day, 1 week, 15 days or the like.

In a first possible implementation manner, considering that the forces applied when the user triggers the touch operation may be different when the touch screen displays different interfaces and thus the signal change level of the touch screen changes. Therefore, in order to prevent impacts caused by the displayed interface, during collecting the signal change levels of the touch screen within the plurality of time periods, signal change levels when the touch screen displays the same interface within the plurality of time periods may be collected. The interface may be a dial-up interface or a game interface or the like, or may also be a sensitive interface that requires a high security and thus may be only accessible to an owner of the smart device, for example, an unlock interface, a payment interface, a login interface or the like.

For example, when the unlock interface is displayed on the touch screen each day, the signal change levels of the touch screen are collected.

In a second possible implementation manner, considering that the touch screen is in different external environments, and the signal change levels of the touch screen may change due to impacts caused by temperature, humidity and the like external environmental factors. Therefore, in order to prevent the impacts caused by the external environments, during collecting the signal change levels of the touch screen within the plurality of time periods, signal change levels when the touch screen is in the same external environment within the plurality of time periods may be collected. For example, the signal change levels of the touch screen and external environment information may be collected, such that the signal change levels having the same external information may be acquired, and the signal change levels having different external information are filtered. The external environment information may include information of temperature, humidity and the like. The same external environment information refers to the case where a difference between the external environment information falls within a certain value range, for example, the temperatures are similar or slightly different.

For example, the signal change level of the touch screen, temperature and humidity are collected every day. When the temperature collected at a time is significantly increased and different from other collected temperatures, the signal change levels collected when the temperature is significantly increased are filtered.

In a third possible implementation manner, in comprehensive consideration of the impacts caused by the interface and the external environment, during collecting the signal change levels of the touch screen within the plurality of time periods, signal change levels when the touch screen is in the same external environment and displays the same interface within the plurality of time periods may be collected.

In the above collection manners, within each time period, only one signal change level of the touch screen may be collected, or a plurality of signal change levels of the touch screen may be collected, and then statistics is performed according to the plurality of signal change levels.

For example, within each time period, a preset number of signal change levels are collected, statistics are performed for a preset number of signal change levels, and an obtained statistical value is used as a signal change level of the touch screen in a corresponding time period. The preset number may be determined according to the duration of the time period or according to a frequency at which the user uses the smart device. For example, within each day, the signal change level may be collected every hour, totally signal change levels are collected for 12 times, and then statistics is performed for the obtained 12 signal change levels.

Herein, during performing statistics for the preset number of signal change levels, an average value of the preset number of signal change levels may be calculated; or a maximum value and a minimum value may be deleted from the preset number of signal change levels, and an average value of the remaining signal change levels can be calculated; or a distribution model may be established according to the preset number of signal change levels, wherein the distribution model includes an occurrence probability of each of the signal change levels, and a signal change level having a maximum occurrence probability in the distribution model is acquired, wherein the distribution model may be a Gaussian distribution model or another type of distribution model. Of course, statistics may also be performed for the preset number of signal change levels in another way.

In step 402, whether the signal change levels of the touch screen within the plurality of time periods satisfy a preset condition; it yes, go to step 403; otherwise, the process ends.

In the embodiments, according to a change rule of the signal change level of the touch screen attached with the protective film, a condition that the signal change level of the touch screen needs to satisfy is defined firstly as a preset condition. When the signal change levels of the touch screen within the plurality of time periods are collected, whether the collected signal change levels satisfy the preset condition is judged. The preset condition may be determined according to the change rule of the signal change levels before and after the protective film is attached to the touch screen.

In a first possible implementation manner, considering that the signal change level before the protective film is attached to the touch screen is great, and the signal change level after the protective film is attached to the touch screen is small, the preset condition thus may be: a difference between the signal change levels of the touch screen within two adjacent time periods is great.

Therefore, a difference between the signal change levels of the touch screen within two adjacent time periods is acquired, and whether the difference is greater than a preset difference is judged. When it is judged that the difference of the signal change level of the touch screen within a first time period and the signal change level of the touch screen within a second time period is greater than a preset difference, the signal change levels within the two time periods change greatly, and in this case, it is determined that the protective film has been attached to the touch screen; wherein the first time period is a time period preceding the second time period.

Herein, the preset difference is used to indicate a difference between the signal change levels before and after the protective film is attached to the touch screen, and may be determined according to the impacts caused by a generic protective film to the signal change level, which may be 60 or 80 or the like.

In a second possible implementation manner, considering that the signal change level before the protective film is attached to the touch screen is great, and a plurality of signal change levels collected after the protective film is attached to the touch screen are all small, the preset condition thus may be: a difference between the signal change level of the touch screen within a time period and the signal change level of the touch screen within a previous time period is great, and a difference between the signal change level of the touch screen within a time period and the signal change level of the touch screen within a next time period is small.

Therefore, the difference between the signal change levels of the touch screen within any two adjacent time periods is acquired, and whether the difference between the signal change level of the touch screen within a time period and the signal change level of the touch screen within a previous time period is greater than the preset difference and whether the difference between the signal change level of the touch screen within a time period and the signal change level of the touch screen within a next time period is not greater than the preset difference are judged. When it is determined that the difference between the signal change level of the touch screen within the first time period and the signal change level of the touch screen within the second time period is greater than the preset difference, and a difference between the signal change level of the touch screen within the second time period and the signal change level of the touch screen within a third time period is not greater than the preset difference, it is determined that the protective film has been attached to the touch screen, wherein the first time period is a time period preceding the second time period, and the third time period is a time period next to the second time period.

In a third possible implementation manner, considering that the signal change level within a time period before the protective film is attached to the touch screen is not greatly different, the signal change level within a time period after the protective film is attached to the touch screen is not greatly different either, but the signal change levels before and after the protective film is attached to the touch screen change greatly. In some unexpected situations, if the user abruptly triggers a touch operation or the like with a small force, the signal change level may greatly change, but the signal change level may return to the original value within a subsequent time period. To prevent interference caused by the unexpected situation, the preset condition may be: a difference between the signal change level of the touch screen within a time period and the signal change levels of the touch screen with a plurality of previous time periods is great, whereas a difference between the signal change level of the touch screen within a time period and the signal change levels of the touch screen a plurality of subsequent time periods is small.

Therefore, when it is determined that the differences between the signal change levels of the touch screen within at least one first time period and the signal change level of the touch screen within the second time period is greater than the preset difference, and a difference between the signal change level of the touch screen within the second time period and the signal change level of the touch screen within at least one third time period is not greater than the preset difference, it is determined that the protective film has been attached to the touch screen, wherein the at least one first time period is a time period preceding the second time period, and the at least one third time period is a time period next to the second time period.

In another embodiment, when it is determined that the collected signal change level does not satisfy the preset condition, it may not be definitely determined whether the protective film has been attached to the touch screen or not. In this case, operations relevant to the protective film are not performed. Alternatively, when it is determined that the collected signal change level does not satisfy the preset condition, whether the protective film has been attached to the touch screen may be judged according to another condition. For example, whether the signal change level of the touch screen falls within the scope of the signal change levels of the touch screen attached with the protective film is judged.

In step 403, when it is determined that the protective film has been attached to the touch screen, a response signal level of the touch screen is reduced.

When it is determined that the protective film has been attached to the touch screen, operations relevant to the protective film may be performed. In the embodiments, the touch screen is configured to make a response to the touch operation when a signal change level generated through the touch operation triggered on the touch screen is greater than the response signal level, whereas the touch operation may be considered as a mis-operation of the user when the signal change level generated by the touch operation triggered on the touch screen is not greater than the response signal level. In this case, no response is made to the touch operation. As compared with the case where the protective film has not been attached to the touch screen, when the protective film has been attached to the touch screen, some impacts may be caused to the sensitivity of the touch screen. In this case, in order to improve the sensitivity, the response signal level of the touch screen may be reduced to offset the impacts caused by the protective film to the signal level.

In some implementations manner, a change range of the signal change levels before and after the protective film is attached to the touch screen may be determined according to the collected signal change levels, and the change range is used as a reduction range of the response signal level.

For example, when the protective film has not been attached to the touch screen, the response signal level is 2200, and the touch screen may make a response to the touch operation when the signal change level generated via the touch operation triggered by the user is greater than 2200. Afterwards, it is detected that the signal change levels of the touch screen within two adjacent time periods are reduced by 80, and thus it is determined that the protective film has been attached to the touch screen. In this case, the response signal level is reduced to 2120. The touch screen may make a response to the touch screen as long as the signal level generated via the touch operation triggered by the user is greater than 2120.

In addition to the operation of reducing the response signal level, other operations may also be performed. In some implementations manner, considering that some smart devices may be equipped with a distance sensor, the distance sensor may detect a distance between the smart device and an obstacle in real time or periodically. However, after the protective film has been attached to the touch screen, if the protective film shields the distance sensor, use effects of the distance sensor may be impacted. To prevent occurrence of this case, the distance between the smart device and the obstacle detected by the distance sensor may also be collected, so as to determine whether the distance is less than a preset distance. The preset distance may be determined according to a thickness of a general protective film and a distance between the distance sensor and the plane where the touch screen is located. When it is determined that the protective film has been attached to the touch screen, and the distances detected the distance sensor detects for multiple consecutive times are all less than the preset distance, an obstacle is present near the distance sensor, and the obstacle may be most probably the protective film. Therefore, prompt information is displayed on the touch screen. The prompt information is used to indicate the probability that the attached protective film shields the distance sensor, such that the user is prompted to check the position of the protective film.

It should be noted that the executive subject of the detection method according to the embodiments may be a smart device or a server. When the executive subject is a smart device, the smart device detects whether the protective film has been attached to the touch screen of the smart device by collecting the signal change level of the touch screen, and performs corresponding operations when the protective film has been attached to the touch screen. When the executive subject is a server, the smart device collects the signal change level of the touch screen and updates the collected signal change level to the server. The server detects whether the protective film has been attached to the touch screen of the smart device according to the collected signal change level. The smart device performs corresponding operations when it is determined that the protective film has been attached to the touch screen.

In the related art, most users may attach a protective film on the touch screen of their smart device. However, the protective film may cause some impacts to the sensitivity of the touch screen. Furthermore, some protective films do not match the touch screen, and may shield the distance sensor, resulting in a poor user experience. In the embodiments, the method may be applied to the scenario where the user uses the smart device for a period of time without attaching the protective film after purchasing the smart device. Based on the signal change levels of the touch screen before and after the protective film is attached to the touch screen, whether the protective film is attached to the touch screen may be detected.

In the methods according to the embodiments, a preset condition is determined according to a change rule of the signal change mount of the touch screen attached with a protective film. The signal change levels of the touch screen within a plurality of time periods are collected, and it is determined that the protective film has been attached to the touch screen when the signal change levels of the touch screen within the plurality of time period satisfy the preset condition. The embodiment further provides a film attaching detection method. Whether a protective film is attached to the touch screen may be accurately detected according to the signal change level of the touch screen in the time dimension. Operations relevant to the protective film may be performed according to the detection result, including optimization the sensitivity of the touch screen and indication that the protective film shields the distance sensor. This enhances the sensitivity and enriches the functions of the smart device.

Further, the signal change levels when the touch screen is in the same external environment and/or displays the same interface within the plurality of time periods are collected. This prevents the impacts caused by the external environment or the interface to the signal change level, and improves the accuracy.

Figure 5:
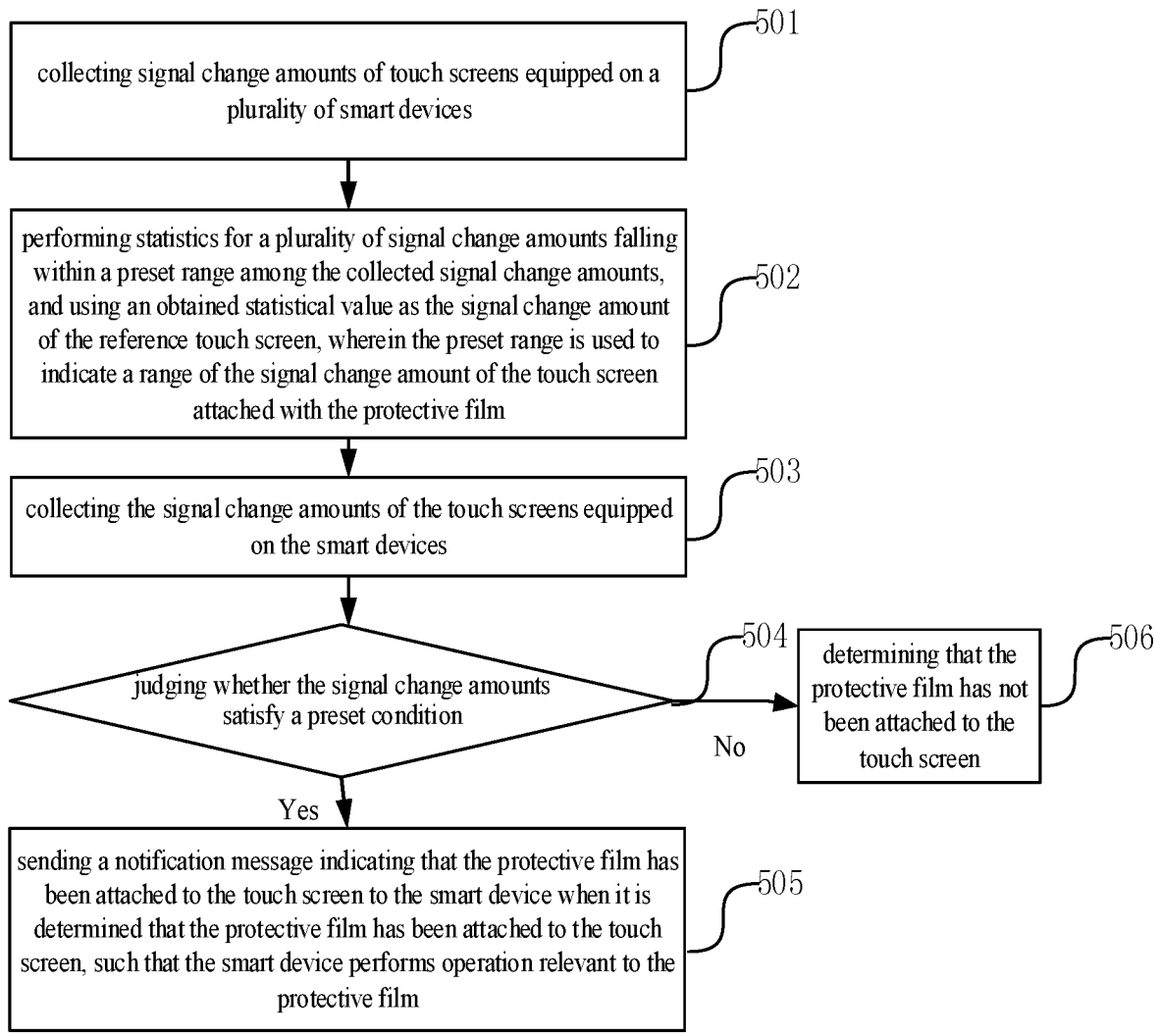
FIG. 5 is a flowchart of a protective film detection method according to some embodiments.

FIG. 5 is a flowchart of a protective film detection method according to some embodiments. The method is applied to a server. As illustrated in FIG. 5, the method includes the following steps:

In step 501, signal change levels of touch screens equipped on a plurality of smart devices are collected.

Herein, the plurality of smart devices may include a mobile phone, a computer, a tablet computer or the like devices. The smart device is equipped with a touch screen, and a user may trigger a touch operation of the touch screen to control the smart device.

In practical application, when the user does not trigger a touch operation on the touch screen, the touch screen may generate an inherent signal level; when the user triggers a touch operation on the touch screen, the signal level generated on the touch screen may change, such that a signal change level is generated. That is, the signal change level is a difference between a signal level generated when a touch operation is triggered on the touch screen and a signal level generated when no touch operation is triggered on the touch screen.

Whether a protective film is attached to the touch screen exerts some impacts on the signal change level. When no protective film is attached to the touch screen, a great signal change level is generated; whereas when a protective film is attached to the touch screen, the user needs to trigger the touch operation on the touch screen via the protective film. As a result, a sensing strength of the touch screen is weakened, and thus the signal change level generated on the touch screen is reduced.

For example, the touch screen has an inherent signal level of 2000, a signal level generated via a touch operation triggered by the user on the touch screen is 2200, and a signal change level is 200; whereas when a protective film is attached to the touch screen, a signal level generated via a touch operation triggered by the user on the touch screen is 2120, and a signal change level is 120. That is, the signal change level is reduced.

Therefore, during use of the smart device, the smart device may collect the signal change level of the touch screen, and send the collected signal change level to the server, such that the server may collect signal change levels sent by a plurality of smart devices. The smart device may collect the signal change level each time the user triggers a touch operation and send the collected signal change level to the server, or may send, at every other period, one or a plurality of signal change levels collected within the period to the server. The period may be 1 hour, 1 day, 1 week or the like.

In step 502, statistics are performed for a plurality of signal change levels falling within a preset range among the collected signal change levels, and an obtained statistical value is used as the signal change level of the reference touch screen, wherein the preset range is used to indicate a range of the signal change level of the touch screen attached with the protective film.

Herein, the preset range is used to indicate a range of the signal change level of the touch screen attached with the protective film. That is, when a signal change level of the touch screen falls within the preset range, it is possible that the protective film has been attached to the touch screen; and when a signal change level of the touch screen does not fall within the preset range, it is possible that the protective film has not been attached to the touch screen.

For example, a signal change level when no protective film has been attached to the touch screen is 200, and a signal change level when the protective film has been attached to the touch screen is 120. In this case, the preset range may be defined as (100, 140).

In the embodiments, after the signal change levels of a plurality of touch screens are collected, a touch screen attached with the protective film can be filtered from the plurality of touch screens according to the preset range, a plurality of signal change levels falling within the preset range are selected from the collected signal change levels, statistics is performed for the selected plurality of signal change levels, and an obtained statistical value is used as a signal change level of the reference touch screen. That is, a reference signal change level is obtained by performing big data analysis for the signal change levels of the plurality of touch screens.

During performing the statistics for the plurality of signal change levels, an average value of the plurality of signal change levels may be calculated; or a maximum value and a minimum value are deleted from the plurality of signal change levels, and an average value of the remaining signal change levels is calculated, so as to prevent interference caused by some exceptions; or a distribution model is established according to the plurality of signal change levels, wherein the distribution model includes an occurrence probability of each of the signal change levels, and a signal change level having a maximum occurrence probability in the distribution model is acquired, wherein the distribution model may be a Gaussian distribution model or another type of distribution model. Nevertheless, statistics may also be performed for the plurality of signal change levels in another way.

A preset condition is defined according to statistical signal change level of the reference touch screen. The preset condition is a condition that the touch screen attached with the protective film needs to satisfy. When the signal change level of a touch screen is slightly different from the signal change level of the reference touch screen, it may be determined that the protective film has been attached to the touch screen. When the signal change level of a touch screen is greatly different from the signal change level of the reference touch screen, it may be determined that the protective film has not been attached to the touch screen.

In some implementations manner, considering that the signal change levels of the touch screen in different states may be different from each other such that in to eliminate the impacts caused by the state to the signal change level, during collecting the signal change levels of the touch screens equipped on a plurality of smart devices, state information of the touch screens may be collected. Afterwards, statistics may be performed for a plurality of signal change levels having the same state information and falling within a preset range in the collected signal change levels and an obtained statistical value is used as the signal change level of the reference touch screen corresponding to the state information. In this way, the signal change level of the reference touch screen in each state is acquired.

Herein, considering that the signal change levels of different types of touch screens are different, the signal change levels of the touch screen in different external environments may change, and the signal change level of the touch screen may also change due to different forces applied by the user to trigger the touch operation. Therefore, the state information may include at least one of screen type, external environment information, and currently displayed interface. The screen type may be represented by the manufacture of the touch screen or represented by a production batch of the touch screen. The external environment information may include temperature, humidity and the like information. The currently displayed interface may be a dial-up interface, an unlock interface, a game interface or the like. Since the forces applied by different users to touch the same interface are slightly different, the impacts caused by the different forces may be neglected.

Therefore, by collecting the signal change levels of the touch screens and state information thereof and performing statistics therefor, the signal change level of the reference touch screen corresponding to each screen type, the signal change level of the reference touch screen in each external environment, and the signal change level of the reference touch screen when each type of interface is displayed may be collected.

A preset condition is defined according to statistically collected the signal change level of the reference touch screen in each state. The preset condition is a condition that the touch screen attached with the protective film needs to satisfy. When the signal change level of a touch screen in the same state is slightly different from the signal change level of the reference touch screen, it may be determined that the protective film has been attached to the touch screen. When the signal change level of a touch screen in different states is greatly different from the signal change level of the reference touch screen, it may be determined that the protective film has not been attached to the touch screen.

In step 503, the signal change levels of the touch screens equipped on the smart devices are collected.

With respect to a smart device, if whether a protective film has been attached to the touch screen of the smart device is to be judged, the smart device may collect a signal change level of the touch screen of the smart device, and send the signal change level to the server. The server performs detection according to the signal change level and the statistically collected signal change level of the reference touch screen.

Considering that the touch screen attached with no protective film may be attached with a protective film, and the protective film may also be removed from the touch screen attached with the protective film, such that in order to timely know the change of the protective film, the signal change level of the touch screen may be collected at every other collection period, and detection may be periodically performed. The period may be 1 day, 1 week or the like.

Alternatively, in consideration of the probability that the smart device attached with no protective film may be attached with a protective film is great, and the probability that the protective film is removed from the smart device attached with the protective film is small. When it is determined that no protective film has been attached to the smart device, collection and detection may be performed relatively frequently based on a smaller collection period. When it is determined that the protective film has been attached to the smart device, the collection period may be increased, and collection and detection may be performed based on a greater collection period.

In step 504, whether the signal change levels satisfy a preset condition is judged; if yes, go to step 505; and otherwise, step 506 is performed.

A difference between the signal change level of the touch screen and the signal change level of the reference touch screen is calculated, and whether the difference is greater than a preset threshold is judged. The preset threshold is used to indicate a fluctuating range of the signal change level of the touch screen attached with the protective film. If the difference is not greater than the preset threshold, the signal change level of the touch screen is equal or approximately equal to, or slightly different from the signal change level of the reference touch screen. Therefore, it is determined that the signal change level satisfies the preset condition, and that the protective film has been attached to the touch screen. If the difference is greater than the preset threshold, the signal change level of the touch screen is greatly different from the signal change level of the reference touch screen. Therefore, it is determined that the signal change level does not satisfy the preset condition, and that no protective film has been attached to the touch screen. The preset threshold may be determined according to the requirement of the precision, for example, 1, 5, 10 or the like.

In some implementations manner, if the signal change level of the reference touch screen in each state is acquired by collecting the signal change level and state information of the touch screen and performing statistics therefor, when the signal change level of the touch screen equipped on the smart device is collected, the signal change level of the reference touch screen corresponding to the state information of the touch screen is determined, whether a difference between the signal change level of the touch screen and the determined signal change level of the reference touch screen is greater than a preset threshold is judged. It is determined that the protective film has been attached to the touch screen when the difference between the signal change level of the touch screen and the determined signal change level of the reference touch screen is not greater than the preset threshold. It is determined that the protective film has not been attached to the touch screen when the difference between the signal change level of the touch screen and the determined signal change level of the reference touch screen is greater than the preset threshold.

Herein, the determining the signal change level of the reference touch screen corresponding to the state information includes at least one of: determining the signal change level of the reference touch screen corresponding to the screen type of the touch screen; determining the signal change level of the reference touch screen corresponding to the external environment information of the touch screen; and determining the signal change level of the reference touch screen corresponding to the interface currently displayed on the touch screen.

With the above possible implementation manner for detecting whether the protective film has been attached to the touch screen, the touch screen for detection is compared with a touch screen in the same state to eliminate interference in different states and improve the detection accuracy.

In step 505, when it is determined that the protective film has been attached to the touch screen, a notification message indicating that the protective film has been attached to the touch screen is sent to the smart device, such that the smart device performs operation relevant to the protective film.

Step 505 is similar to the abovementioned step 403, which is thus not described herein any further.

In step 506, it is determined that the protective film has not been attached to the touch screen.

It should be noted that the embodiments only take the case that the executive subject is a server as an example, the server performs the collection, statistics and detection operations. In another embodiment, the server may collect the signal change levels uploaded by the plurality of smart devices, and perform statistics to acquire the signal change level of the reference touch screen Afterwards, the server may send the signal change level of the reference touch screen to the smart devices. The smart devices perform local detection and perform corresponding processing operations according to the detection result.

In the related art, most users may attach a protective film on the touch screen of their smart device after purchasing. However, the protective film may cause some impacts to the sensitivity of the touch screen. Furthermore, some protective films do not match the touch screen, and may shield the distance sensor, resulting in a poor user experience. The embodiments may be applied to the scenario where the user purchases a smart device and then immediately attaches a protective film to the touch screen of the smart device. By comparing the signal change levels of a plurality of touch screens with the signal change level of a touch screen to be detected, whether the protective film has been attached to the touch screen may be detected.

In the method according to the embodiments, the signal change levels of the plurality of touch screens are collected, the statistics of the signal change level of the reference touch screen attached with the protective film is performed, and the preset condition is defined according to the signal change level of the reference touch screen. When the signal change level of a specific touch screen satisfies the preset condition, it is determined that the protective film has been attached to the touch screen. This embodiment further provides a film attaching detection method. Whether the protective film has been attached to the touch screen may be accurately detected according to the signal change levels of the plurality of touch screens. Processing operations relevant to the protective film may be performed according to the detection result. This improves the sensitivity, and enriches the functions of the smart device.

In addition, big data analysis is performed based on the change rule of the signal change level of the same type of touch screen in the same state. This prevents the impacts caused by the different states, and improves the detection accuracy.

Figure 6:
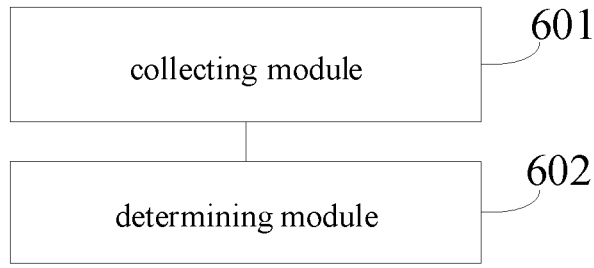
FIG. 6 is a block diagram of a protective film detection apparatus according to some embodiments.

FIG. 6 is a block diagram of a protective film detection apparatus according to some embodiments. Referring to FIG. 6, the apparatus includes a collecting module 601 and a determining module 602.

The various device components, units, blocks, or portions may have modular configurations, or are composed of discrete components, but nonetheless may be referred to as "modules" in general. In other words, the "modules" or "units" referred to herein may or may not be in modular forms.

The various device components, units, blocks, portions, or modules may be realized with hardware, software, or a combination of hardware and software.

The collecting module 601 is configured to collect a signal change level of a touch screen equipped on a smart device, the signal change level being a difference between a signal level generated when a touch operation is triggered on the touch screen and a signal level generated when no touch operation is triggered on the touch screen.

The determining module 602 is configured to determine that a protective film has been attached to the touch screen when the signal change level satisfies a preset condition, the preset condition being used to indicate a condition that a signal change level of the touch screen attached with the protective film needs to satisfy.

In some implementations, the preset condition is determined according to a change rule of the signal change level of the touch screen attached with the protective film; the collecting module 601 is configured to collect signal change levels of the touch screen within a plurality of time periods; and the determining module 602 is configured to determine that the protective film has been attached to the touch screen when the signal change levels of the touch screen within the plurality of time periods satisfy the preset condition.

In some implementations, the collecting module 601 is further configured to: collect signal change levels when the touch screen displays the same interface within the plurality of time periods; or collect signal change levels when the touch screen is in the same external environment within the plurality of time periods; or collect signal change levels when the touch screen is in the same external environment and displays the same interface within the plurality of time periods.

In some implementations, the collecting module 601 includes: an collecting unit configured to collect a preset number of signal change levels of the touch screen within each of the time periods; and a statistics unit configured to perform statistics for the preset number of signal change levels, and obtain a statistical value as a signal change level of the touch screen in a corresponding time period.

In some implementations, the statistics unit is further configured to: calculate an average value of the preset number of signal change levels; or delete a maximum value and a minimum value from the preset number of signal change levels, and calculate an average value of the remaining signal change levels; or establish a distribution model according to the preset number of signal change levels, the distribution model comprising an occurrence probability of each of the signal change levels, and collect a signal change level having a maximum occurrence probability in the distribution model.

In some implementations, the determining module 602 includes: a first determining unit configured to determine that the protective film has been attached to the touch screen when a difference between the signal change level of the touch screen within a first time period and the signal change level of the touch screen within a second time period is greater than a preset difference, the first time period being a time period preceding the second time period, and the preset difference being used to indicate a difference between the signal change level of the touch screen before being attached with the protective film and the signal change level of the touch screen after being attached with the protective film.

In some implementations, the determining module 602 includes: a second determining unit configured to determine that the protective film has been attached to the touch screen when a difference between the signal change level of the touch screen within a first time period and the signal change level of the touch screen within a second time period is greater than a preset difference, and a difference between the signal change level of the touch screen within the second time period and the signal change level of the touch screen within a third time period is not greater than the preset difference, the first time period being a time period preceding the second time period, the third time period being a time period next to the second time period, and the preset difference being used to indicate a difference between the signal change level of the touch screen before being attached with the protective film and the signal change level of the touch screen after being attached with the protective film.

In some implementations, the determining module 602 includes: a third determining unit configured to determine that the protective film has been attached to the touch screen when a difference between the signal change level of the touch screen within at least one first time period and the signal change level of the touch screen within a second time period is greater than a preset difference, and a difference between the signal change level of the touch screen within the second time period and the signal change level of the touch screen within at least one third time period is not greater than the preset difference, the at least one first time period being a time period preceding the second time period, the at least one third time period being a time period next to the second time period, and the preset difference being used to indicate a difference between the signal change level of the touch screen before being attached with the protective film and the signal change level of the touch screen after being attached with the protective film.

In some implementations, the preset condition comprises a signal change level of a reference touch screen attached with a protective film; and the determining module 602 is configured to determine that a protective film has been attached to the touch screen when a difference between the signal change level of the touch screen and the signal change level of the reference touch screen is not greater than a preset threshold, the preset threshold being used to indicate a fluctuating range of the signal change level of the touch screen attached with the protective film.

In some implementations, the apparatus further includes: a collecting module configured to collect signal change levels of touch screens equipped on a plurality of smart devices; and a statistics module configured to collect statistics for a plurality of signal change levels falling within a preset range among the collected signal change levels, and obtain a statistical value as the signal change level of the reference touch screen, the preset range being used to indicate a range of the signal change level of the touch screen attached with the protective film.

In some implementations, the collecting module is further configured to collect the signal change levels of the touch screens equipped on the plurality of smart devices and state information thereof; and the statistics module is further configured to collect statistics for a plurality of signal change levels having the same state information and falling within the preset range among the collected signal change levels, and obtain a statistical value as a signal change level of the reference touch screen corresponding to the state information.

In some implementations, the determining module 602 is further configured to determine the signal change level of the reference touch screen corresponding to the state information; and determine that the protective film has been attached to the touch screen when a difference between the signal change level of the touch screen and the determined signal change level of the reference touch screen is not greater than the preset threshold.

In some implementations, the state information comprises at least one of screen type, external environment information and currently displayed interface.

In some implementations, the statistics module is further configured to: calculate an average value of the plurality of signal change levels; or delete a maximum value and a minimum value from the plurality of signal change levels, and calculating an average value of the remaining signal change levels; or establish a distribution model according to the plurality of signal change levels, the distribution model comprising an occurrence probability of each of the signal change levels, and acquiring a signal change level having a maximum occurrence probability in the distribution model.

In some implementations, the apparatus further includes: a responding module configured to reduce a response signal level of the touch screen when it is determined that the protective film has been attached to the touch screen, wherein the touch screen is configured to make a response to a touch operation when a signal level generated by the touch operation triggered on the touch screen is greater than the response signal level.

In some implementations, the smart device is further equipped with a distance sensor. The apparatus further includes: a prompting module configured to display prompt information on the touch screen when it is determined that the protective film has been attached to the touch screen and distances detected by the distance sensor for consecutive multiple times are all less than a preset distance, wherein the prompt information is used to indicate it is possible that the attached protective film shields the distance sensor.

In the description of the present disclosure, the terms "one embodiment," "one implementation," "some embodiments," "some implementations," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Therefore, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

With respect to the apparatus of the above embodiments, the specific method of operation performed by each module has been described in details in the embodiments of the method, and the description thereof may not be described in details herein.

It should be noted that the protective film detection apparatus provided by the above embodiments is exemplified only by the above division of each of the functional modules when the protective film detection apparatus is in a photographing mode by default. In practice, the above-described functions may be assigned and completed by different functional modules in accordance with requirements, such that the internal structure of the processor or the smart device may be divided into different functional modules to complete all or part of the functions described above. In addition, the protective film detection apparatus and the protective film detection method provided in the above embodiments follow the same principal, and the specific implementation process thereof can be described in the method embodiments and may not be described again herein.

Figure 7:
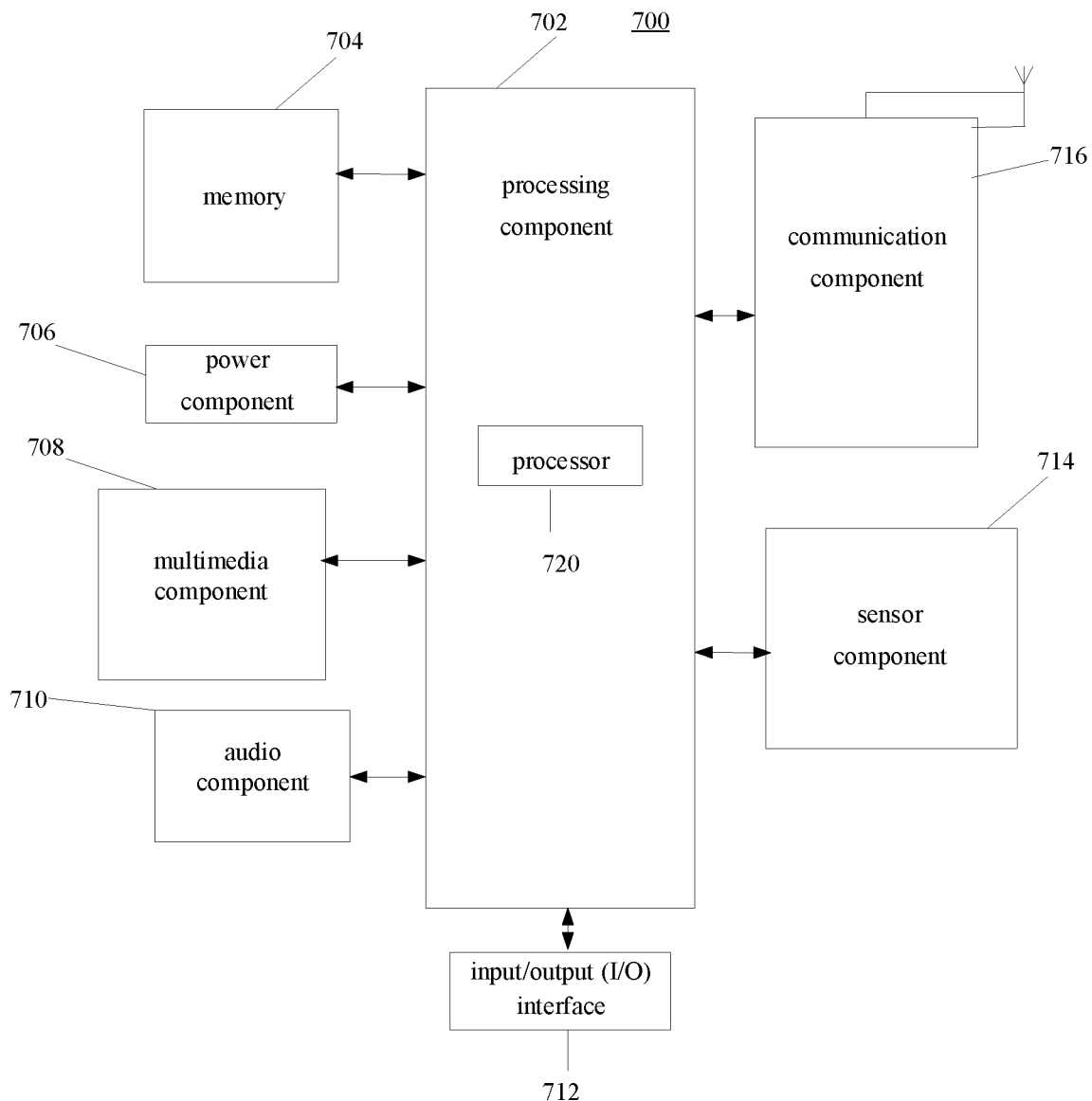
FIG. 7 is a block diagram of a protective film detection apparatus according to some embodiments.

FIG. 7 is a block diagram of a protective film detection apparatus 700 according to some embodiments. For example, the apparatus 700 may be a mobile phone, a computer, a digital broadcast terminal, a messaging device, a gaming console, a tablet, a medical device, exercise equipment, a personal digital assistant, and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the apparatus 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 700. Examples of such data include instructions for any applications or methods operated on the apparatus 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the apparatus 700. The power component 706 may include a power management system, one or more power sources, and any other components associated with the generation, management, and distribution of power in the apparatus 700.

The multimedia component 708 includes a screen providing an output interface between the apparatus 700 and the user. In some embodiments, the screen may include a liquid crystal display (LCD) and a touch panel (TP).

In some embodiments, the screen may include a light-emitting diode (LED), such as an organic LED (OLED) display. In some implementations, the display can be a flexible display.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the apparatus 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the apparatus 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the apparatus 700. For instance, the sensor component 714 may detect an open/closed status of the apparatus 700, relative positioning of components, e.g., the display and the keypad, of the apparatus 700, a change in position of the apparatus 700 or a component of the apparatus 700, a presence or absence of user contact with the apparatus 700, an orientation or an acceleration/deceleration of the apparatus 700, and a change in temperature of the apparatus 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the apparatus 700 and other devices. The apparatus 700 may access a wireless network based on a communication standard, such as WiFi, 2G, or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executed by the processor 720 in the apparatus 700, for performing the above-described methods. For example, the non-transitory computer-readable storage medium may be a ROM, a RAM, a CD-ROM, a magnetic tape, a floppy disc, an optical data storage device, and the like.

There is further provided computer-readable storage medium. The instructions stored in the computer-readable storage medium, when executed by the processor of the smart device, cause the smart device to perform the methods in the above embodiments. The method includes:

collecting a signal change level of a touch screen equipped on a smart device, the signal change level being a difference between a signal level generated when a touch operation is triggered on the touch screen and a signal level generated when no touch operation is triggered on the touch screen; and determining that a protective film has been attached to the touch screen when the signal change level satisfies a preset condition, the preset condition being used to indicate a condition that a signal change level of the touch screen attached with the protective film needs to satisfy.

Figure 8:
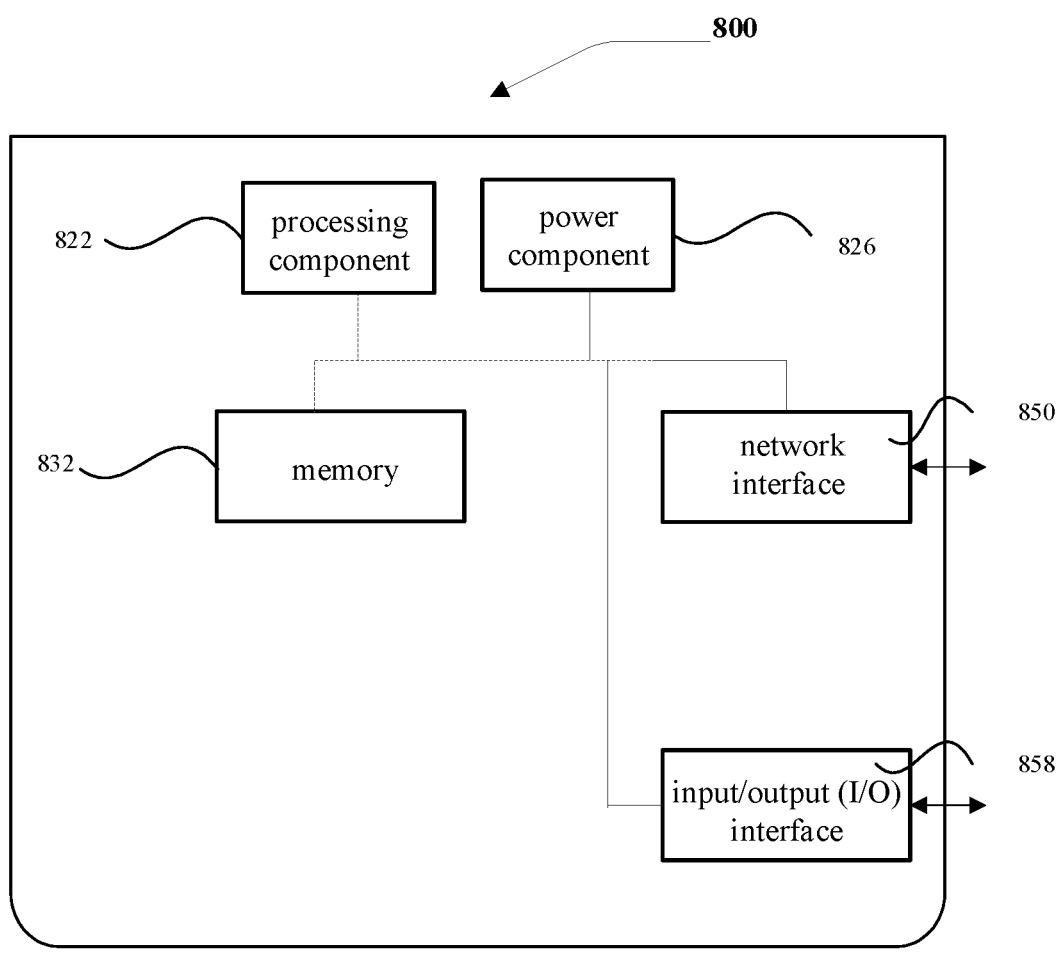
FIG. 8 is a block diagram of a protective film detection apparatus according to some embodiments.

FIG. 8 is a block diagram of a protective film detection apparatus 800 according to some embodiments. For example, the apparatus 800 may be a server. Referring to FIG. 8, the apparatus 800 may include a processing component 822 which may further include one or more processors, and memory resource represented by a memory 832 for storing instructions executable by the processing component 822, such as application programs. The application programs stored in the memory 832 may include one or more modules, each of which corresponds to a set of instructions. Further, the processing component 822 may be configured to execute the instructions for performing the protective film detection method.

The apparatus 800 may further include a power component 826 configured to perform power management of the apparatus 800, a wired or wireless network interface 850 configured to connect the server 800 to the network, and an input/output (I/O) interface 858. The apparatus 800 may operate an operating system based on and stored in the memory 832, such as Windows Server™, Mac OS X™, Unix™, Linux™, FreeBSD™ or the like.

There is further provided a non-transitory computer-readable storage medium having stored therein instructions. The instructions may be executed by the processor of the server to perform the method in the above embodiments. The method includes:

collecting a signal change level of a touch screen equipped on a smart device, the signal change level being a difference between a signal level generated when a touch operation is triggered on the touch screen and a signal level generated when no touch operation is triggered on the touch screen; and determining that a protective film has been attached to the touch screen when the signal change level satisfies a preset condition, the preset condition being used to indicate a condition that a signal change level of the touch screen attached with the protective film needs to satisfy.

The instructions can be part of a computer program, code, software, or application ("APP"). Such a computer program, code, software, or APP can be written in any suitable programming language.

At least some of the embodiments of the present disclosure can have one or more of the following advantages. For example, according to the method, apparatus, and storage medium in the embodiments of the present disclosure, the signal change level of the touch screen is collected. When the signal change level satisfies the condition where the signal change level of the touch screen is attached with the protective film, it is determined that touch screen is attached with the protective film. Therefore, whether the protective film is attached can be automatically detected, enriching the functions of the smart device.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method of detecting a protective film, comprising:
   collecting a signal change level of a touch screen, the signal change level comprising a difference between a signal level generated from a touch operation and a signal level generated from no touch operation; and
   determining that a protective film has been attached to the touch screen upon the signal change level satisfying a preset condition, wherein:
   the preset condition comprises a signal change level of a reference touch screen attached with a protective film, and the determining that a protective film has been attached to the touch screen upon the signal change level satisfying a preset condition comprises:
   determining that the protective film has been attached to the touch screen upon a difference between the signal change level of the touch screen and the signal change level of the reference touch screen being not greater than a preset threshold, the preset threshold being used to indicate a fluctuating range of the signal change level of the touch screen attached with the protective film, and
   prior to collecting a signal change level of a touch screen, the method further comprises:

collecting signal change levels of touch screens equipped on a plurality of smart devices; and performing statistics for a plurality of signal change levels falling within a preset range among the collected signal change levels, and obtaining a statistical value as the signal change level of the reference touch screen, the preset range being used to indicate a range of the signal change level of the touch screen attached with the protective film.

2. The method according to claim 1, wherein:
the preset condition is determined according to a change rule of the signal change level of the touch screen attached with the protective film;
the collecting comprises collecting signal change levels of the touch screen within a plurality of time periods; and
the determining comprises: determining that the protective film has been attached to the touch screen upon the signal change levels of the touch screen within the plurality of time periods satisfy the preset condition.

3. The method according to claim 2, wherein the collecting signal change levels of the touch screen within a plurality of time periods comprises at least one of:
collecting signal change levels upon the touch screen displaying a same interface within the plurality of time periods;
collecting signal change levels upon the touch screen being in a same external environment within the plurality of time periods; or
collecting signal change levels upon the touch screen being in a same external environment and displaying a same interface within the plurality of time periods.

4. The method according to claim 2, wherein the collecting signal change levels of the touch screen within a plurality of time periods comprises:
collecting a preset number of signal change levels of the touch screen within each of the time periods; and
performing statistics for the preset number of signal change levels, and obtaining a statistical value as a signal change level of the touch screen in a corresponding time period.

5. The method according to claim 4, wherein the performing statistics for the preset number of signal change levels, and obtaining a statistical value as a signal change level of the touch screen in a corresponding time period comprises at least one of:
calculating an average value of the preset number of signal change levels;
deleting a maximum value and a minimum value from the preset number of signal change levels, and calculating an average value of remaining signal change levels; or
establishing a distribution model according to the preset number of signal change levels, the distribution model comprising an occurrence probability of each of the signal change levels, and collecting a signal change level having a maximum occurrence probability in the distribution model.

6. The method according to claim 2, wherein the determining that the protective film has been attached to the touch screen upon the signal change levels of the touch screen within the plurality of time periods satisfying the preset condition comprises:
determining that the protective film has been attached to the touch screen upon a difference between the signal change level of the touch screen within a first time period and the signal change level of the touch screen within a second time period being greater than a preset difference, the first time period being a time period preceding the second time period, and the preset difference being used to indicate a difference between the signal change level of the touch screen before being attached with the protective film and the signal change level of the touch screen after being attached with the protective film.

7. The method according to claim 2, wherein the determining that the protective film has been attached to the touch screen upon the signal change levels of the touch screen within the plurality of time periods satisfying the preset condition comprises:
determining that the protective film has been attached to the touch screen upon a difference between the signal change level of the touch screen within a first time period and the signal change level of the touch screen within a second time period being greater than a preset difference, and a difference between the signal change level of the touch screen within the second time period and the signal change level of the touch screen within a third time period being not greater than the preset difference, the first time period being a time period preceding the second time period, the third time period being a time period next to the second time period, and the preset difference being used to indicate a difference between the signal change level of the touch screen before being attached with the protective film and the signal change level of the touch screen after being attached with the protective film.

8. The method according to claim 2, wherein the determining that the protective film has been attached to the touch screen upon the signal change levels of the touch screen within the plurality of time periods satisfying the preset condition comprises:
determining that the protective film has been attached to the touch screen upon a difference between the signal change level of the touch screen within at least one first time period and the signal change level of the touch screen within a second time period being greater than a preset difference, and a difference between the signal change level of the touch screen within the second time period and the signal change level of the touch screen within at least one third time period being not greater than the preset difference, the at least one first time period being a time period preceding the second time period, the at least one third time period being a time period next to the second time period, and the preset difference being used to indicate a difference between the signal change level of the touch screen before being attached with the protective film and the signal change level of the touch screen after being attached with the protective film.

9. The method according to claim 1, wherein the collecting signal change levels of touch screens equipped on a plurality of smart devices comprises: collecting the signal change levels of the touch screens equipped on the plurality of smart devices and state information thereof; and
the performing statistics for a plurality of signal change levels falling within a preset range among the collected signal change levels, and obtaining a statistical value as the signal change level of the reference touch screen comprises:
performing statistics for a plurality of signal change levels having the same state information and falling within the preset range among the collected signal change levels, and obtaining a statistical value as a signal change level of the reference touch screen corresponding to the state information.

10. The method according to claim 9, wherein the determining that the protective film has been attached to the touch screen upon a difference between the signal change level of the touch screen and the signal change level of the reference touch screen being not greater than a preset threshold comprises:
  determining the signal change level of the reference touch screen corresponding to the state information of the touch screen; and
  determining that the protective film has been attached to the touch screen upon a difference between the signal change level of the touch screen and the determined signal change level of the reference touch screen being not greater than the preset threshold.

11. The method according to claim 9, wherein the state information comprises at least one of screen type, external environment information, or currently displayed interface.

12. The method according to claim 1, wherein the performing statistics for a plurality of signal change levels falling within a preset range among the collected signal change levels, and obtaining a statistical value as the signal change level of the reference touch screen comprises at least one of:
  calculating an average value of the plurality of signal change levels;
  deleting a maximum value and a minimum value from the plurality of signal change levels, and calculating an average value of remaining signal change levels; or
  establishing a distribution model according to the plurality of signal change levels, the distribution model comprising an occurrence probability of each of the signal change levels, and collecting a signal change level having a maximum occurrence probability in the distribution model.

13. The method according to claim 1, further comprising:
  reducing a response signal level of the touch screen upon determining that the protective film has been attached to the touch screen, wherein the touch screen is configured to make a response to a touch operation when a signal level generated by the touch operation triggered on the touch screen is greater than the response signal level.

14. The method according to claim 1, wherein:
  the protection film is equipped on a smart device;
  the smart device further comprises a distance sensor; and
  the method further comprises:
  displaying prompt information on the touch screen upon determining that the protective film has been attached to the touch screen and distances detected by the distance sensor for consecutive multiple times are all less than a preset distance, wherein the prompt information is used to prompt it is possible that the attached protective film shields the distance sensor.

15. A protective film detection apparatus, comprising:
  a processor; and
  memory for storing instructions executable by the processor;
  wherein the processor is configured to:
  collect a signal change level of a touch screen equipped on a smart device, the signal change level being a difference between a signal level generated from a touch operation and a signal level generated from no touch operation; and
  determine that a protective film has been attached to the touch screen when the signal change level satisfies a preset condition, the preset condition being used to indicate a condition that a signal change level of the touch screen attached with the protective film needs to satisfy, wherein:
  the preset condition comprises a signal change level of a reference touch screen attached with a protective film, and the determining that a protective film has been attached to the touch screen upon the signal change level satisfying a preset condition comprises:
  determining that the protective film has been attached to the touch screen upon a difference between the signal change level of the touch screen and the signal change level of the reference touch screen being not greater than a preset threshold, the preset threshold being used to indicate a fluctuating range of the signal change level of the touch screen attached with the protective film, and
  prior to the collecting a signal change level of a touch screen, the processor is further configured to:
  collect signal change levels of touch screens equipped on a plurality of smart devices; perform statistics for a plurality of signal change levels falling within a preset range among the collected signal change levels, and obtain a statistical value as the signal change level of the reference touch screen, the preset range being used to indicate a range of the signal change level of the touch screen attached with the protective film.

16. The apparatus according to claim 15, wherein:
  the preset condition is determined according to a change rule of the signal change level of the touch screen attached with the protective film;
  the collecting a signal change level of a touch screen equipped on a smart device comprises: collecting signal change levels of the touch screen within a plurality of time periods; and
  the determining that a protective film has been attached to the touch screen upon the signal change level satisfying a preset condition comprises: determining that the protective film has been attached to the touch screen upon the signal change levels of the touch screen within the plurality of time periods satisfying the preset condition.

17. A non-transitory computer-readable storage medium having stored therein an instruction that, when executed and performed by a processor to perform the following operations:
  collecting a signal change level of a touch screen equipped on a smart device, the signal change level being a difference between a signal level generated when a touch operation is triggered on the touch screen and a signal level generated when no touch operation is triggered on the touch screen; and
  determining that a protective film has been attached to the touch screen upon the signal change level satisfying a preset condition, the preset condition being used to indicate a condition that a signal change level of the touch screen attached with the protective film needs to satisfy, wherein:
  the preset condition comprises a signal change level of a reference touch screen attached with a protective film, and the determining that a protective film has been attached to the touch screen upon the signal change level satisfying a preset condition comprises:
  determining that the protective film has been attached to the touch screen upon a difference between the signal change level of the touch screen and the signal change level of the reference touch screen being not greater than a preset threshold, the preset threshold being used to indicate a fluctuating range of the signal change level of the touch screen attached with the protective film, and prior to the collecting a signal change level of a touch screen, the instruction is executed and performed by the processor to perform:

collecting signal change levels of touch screens equipped on a plurality of smart devices; performing statistics for a plurality of signal change levels falling within a preset range among the collected signal change levels, and obtaining a statistical value as the signal change level of the reference touch screen, the preset range being used to indicate a range of the signal change level of the touch screen attached with the protective film.

* * * * *